United States Patent [19]
Toth et al.

[11] Patent Number: 5,987,762
[45] Date of Patent: Nov. 23, 1999

[54] PULLEY ALIGNMENT GAUGE

[75] Inventors: Gerard Steven Toth, Belleville; William C. Deneszczuk, Saline, both of Mich.

[73] Assignee: Ford Motor Company, Dearborn, Mich.

[21] Appl. No.: 08/926,417

[22] Filed: Sep. 9, 1997

[51] Int. Cl.$^6$ .................................................. G01B 11/27
[52] U.S. Cl. ........................ 33/286; 33/DIG. 21; 33/227
[58] Field of Search .............................. 33/286, 227, 281, 33/DIG. 21, 600, 529, 533, 645

[56] References Cited

U.S. PATENT DOCUMENTS

| | | | |
|---|---|---|---|
| 2,714,255 | 8/1955 | Glazer | 33/286 |
| 4,231,161 | 11/1980 | Belfiore . | |
| 4,249,294 | 2/1981 | Belfiore . | |
| 4,319,406 | 3/1982 | Pehrson, Sr. et al. | 33/286 |
| 4,553,335 | 11/1985 | Woyton | 33/DIG. 1 |
| 4,709,485 | 12/1987 | Bowman | 33/286 |
| 5,026,998 | 6/1991 | Holzl . | |
| 5,320,581 | 6/1994 | Avery . | |
| 5,488,472 | 1/1996 | January . | |

OTHER PUBLICATIONS

TacStar Industries, Inc. Universal Pistol Laser Installation Instructions(Date Unknown).

*Primary Examiner*—Christopher W. Fulton
*Attorney, Agent, or Firm*—Jerome R. Drouillard

[57] ABSTRACT

A pulley alignment gauge for aligning pulleys in a drive system, such as a front end accessory drive system on an automotive engine, includes pulley mounts and a laser connected to a frame. The drive belt is removed before the gauge is placed on the pulleys. The pulley mounts position the gauge on one of the pulleys in the pair to be aligned. The laser emits a light beam onto the adjacent pulley to determine pulley alignment. The laser targets the center rib of the adjacent pulley being aligned and the rib spacing is used to gauge the degree of misalignment.

3 Claims, 2 Drawing Sheets

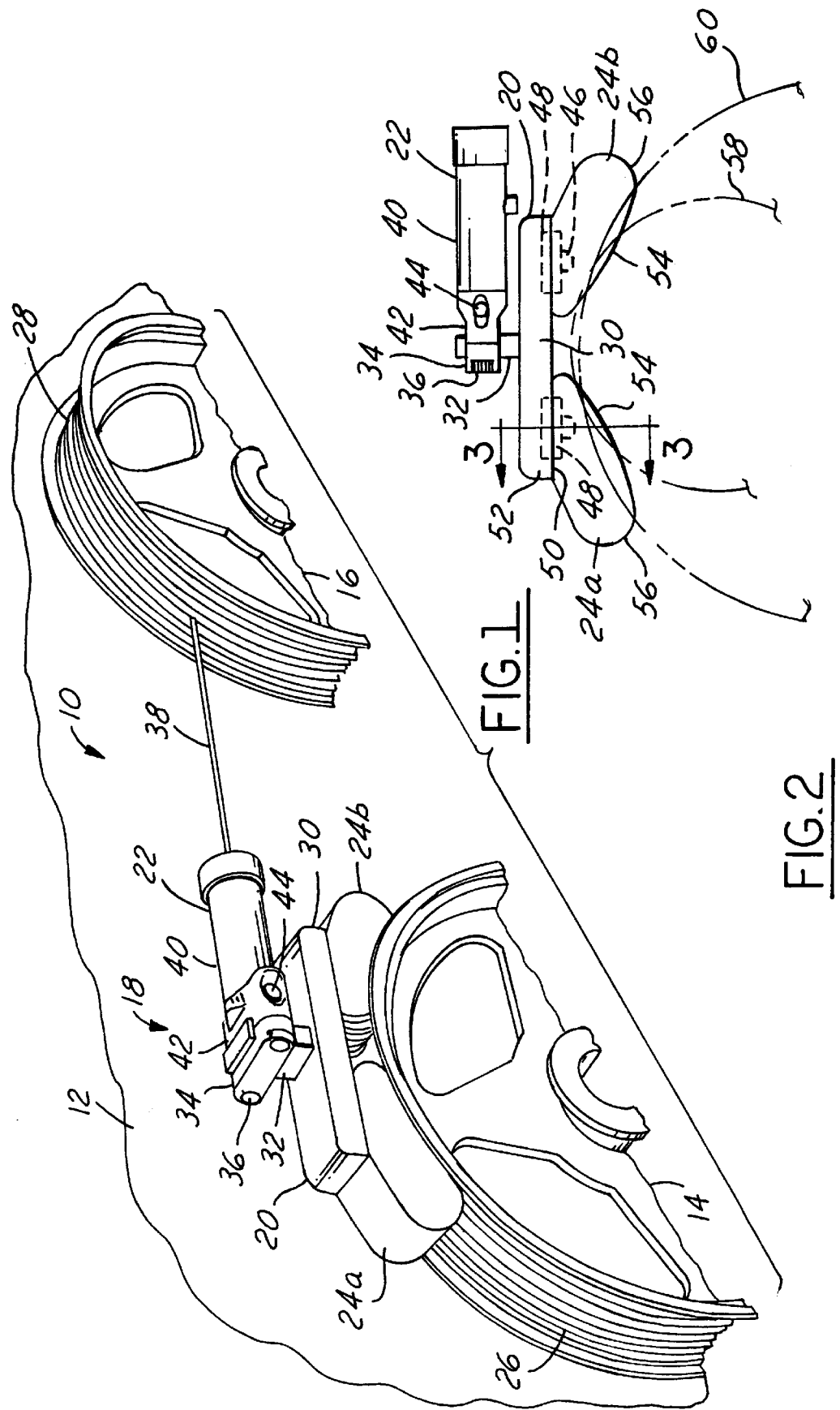

PULLEY ALIGNMENT GAUGE

FIELD OF THE INVENTION

This invention relates to pulley alignment gauges, and more particularly to, pulley alignment gauges for accessory drive systems of internal combustion engines.

BACKGROUND OF THE INVENTION

An accessory drive system is used to power the accessories of an internal combustion engine. The accessories typically include an air conditioning compressor, a power steering pump, and an alternator. A front end accessory drive belt is trained around pulleys to supply power from the crankshaft of the engine to the accessories. Front end accessory drive belts are sensitive to misalignment. Pulley to pulley misalignment of only a few degrees can result in increased system noise, belt wear, and imposes an offset load on the pulleys potentially causing a premature failure of the drive belt system.

Alignment techniques have been developed to resolve some of these concerns. It is known to place a straight edge between two pulleys or to attach a mechanical arm to one pulley and extend it out to reach the other pulley to visually check for alignment. A more accurate alignment tool used is a coordinate measuring machine (CMM). This tool requires either the removal of the engine from the vehicle to place on a CMM or a significant teardown of the vehicle to create access to the pulleys for a portable CMM. The raw data from the CMM is then converted to the misalignment angle by use of custom software algorithms.

The inventors of the present invention have found certain disadvantages with these prior art devices. For example, using visual and straight edge alignment produces inaccurate results and causes unnecessary adjustments to the pulleys. These procedures fail to satisfy the customer resulting in second repairs or loss of repeat business. A mechanical arm may correctly align the two pulleys; however, multiple mechanical arms of various spans would be required to accommodate the different lengths between the pulleys in a single drive belt system. And, although using a CMM accurately aligns the pulleys, using this method of alignment is impractical for service due to the extensive time and cost spent tearing down the vehicle and collecting the data.

SUMMARY OF THE INVENTION

An object of the present invention is to provide a quick and accurate process for aligning pulleys in a front end accessory drive belt system.

This object is achieved, and disadvantages of prior art approaches are overcome by providing a novel pulley alignment gauge for aligning pulleys mounted in a drive system. In one particular aspect of the invention, the gauge includes a frame, a pulley mount attached to the frame and adapted to position the gauge on a first pulley of the drive system, and a laser mounted on the frame. The laser emits a light beam onto a second pulley of the drive system so as to enable alignment of the first pulley relative to the second pulley.

In a preferred embodiment, the pulley mounts can be interchanged to accommodate various pulley types and sizes. The pulley mounts can be attached magnetically to the frame for ease of changing.

An advantage of the invention is that alignment of any length span within the drive system may be accomplished.

Another advantage of the present invention is a highly accurate pulley alignment may be achieved, depending on specific design tolerance and span length.

Also another advantage of the present invention is that an accurate diagnostic may be completed in a relatively short time.

Yet another advantage of the present invention is customer satisfaction will be improved by eliminating misdiagnosis and changing otherwise acceptable parts.

Other objects, features and advantages of the present invention will be readily appreciated by the reader of this specification.

BRIEF DESCRIPTION OF THE DRAWINGS

The invention will now be described by way of example with reference to the accompanying drawings in which:

FIG. 1 is a perspective view of a pair of pulleys to be aligned with the use of a pulley alignment gauge according to the present invention;

FIG. 2 is a front view of a pulley alignment gauge shown in FIG. 1 according to the present invention;

DETAILED DESCRIPTION OF THE PREFERRED EMBODIMENTS

Figure 3:
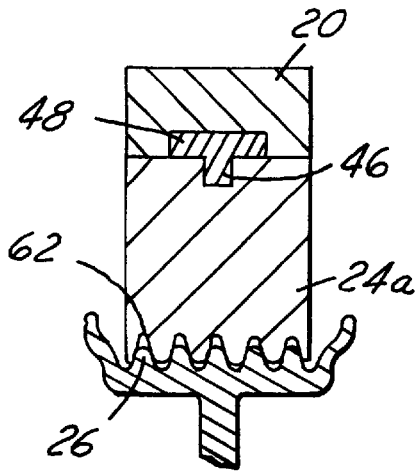
FIG. 3 is a view taken along line 3—3 of FIG. 2 of a pulley alignment gauge according to the present invention.

Drive system 10, shown in FIG. 1 as an accessory drive system, is used to power the accessories of an internal combustion engine 12. The accessories typically include an air conditioning compressor, a power steering pump, and an alternator, not shown. An accessory drive belt (not shown in FIG. 1) is trained around pulleys 14, 16 to supply power from crankshaft (not shown) of engine 12 to the accessories. Misalignment of pulleys 14, 16 causes increased system noise, belt wear, and imposes a load on pulleys 14, 16. To avoid premature failure of accessory drive system 10, according to the present invention, the belt is removed from engine 12 and pulley alignment gauge 18 is placed on pulley 14 to check for alignment.

Pulley alignment gauge 18 includes frame 20, laser 22, and pulley mounts 24a and 24b for mounting on a pulley. Pulleys 14 and 16 have a plurality of ribs 26, 28, respectively. Frame 20 includes longitudinal member 30 with perpendicular support 32 connected to the middle of frame 20 for attaching to laser mount 34 by screws 36. Laser 22 is mounted to the center of frame 20 to align light beam 38 of laser 22 with the center of ribs 28 of adjacent pulley 16. Laser 22 has a generally cylindrical body 40 coupled to laser mount 34 by end cap 42. Laser 22 is battery operated and has on/off switch 44 located on end cap 42 which can be activated from either side of end cap 42. An example of such a laser is the Universal Pistol Laser manufactured by Tac-Star™ Industries, Inc.

As shown in the example of FIGS. 2 and 3, two pulley mounts, 24a and 24b are used and are mounted to the bottom of frame 20. Those skilled in the art will recognize in view of this disclosure that pulley mounts 24a and 24b may be attached to frame 20 by any attachment means available such as screws. In a preferred embodiment, pulley mounts 24a and 24b may be attached by magnets 48 to frame 20, as shown in FIG. 2. To properly attach pulley mounts 24 to frame 20, magnets 48 have tabs 46 for aligning pulley mounts 24a and 24b to the center of frame 20. Each pulley mount 24a and 24b has flat top 50 for mounting to bottom 52 of frame 20, convex bottom surface 54 for mating with pulley 14 or pulley 16, and outer side 56 of a sufficient radius to prevent interference when mounted on pulley 14 or pulley 16. Convex bottom surface 54 enables pulley mounts 24a and 24b to adapt to a plurality of pulley diameters including a relatively small pulley 58 and relatively large pulley 60. Alternatively, a plurality of pulley mount sizes may be used to accommodate a variety of pulley diameters. Pulley mounts 24a and 24b have a plurality of complementing grooves 62 for mounting to ribs 26 of a pulley. To use gauge 18, the number of grooves 62 (see FIG. 3) from where light beam 38 hits to the target center of ribs 28 are counted to determine the misalignment. The misalignment angle is the arc tangent of the [(# of grooves * rib spacing)/span length]. Reversing the direction of the measurement from pulley 14 to pulley 16 and turning pulleys 14 and 16 will further reveal errors in alignment such as pulley tilt, run-out, or bent shafts.

Figure 4:
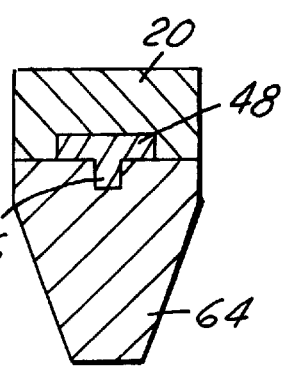
FIGS. 4 and 5 are alternative embodiments of a pulley alignment gauge shown in FIG. 3; and, FIG. 6 is a front view of an alternative embodiment of a pulley alignment gauge according to the present invention.
Figure 5:
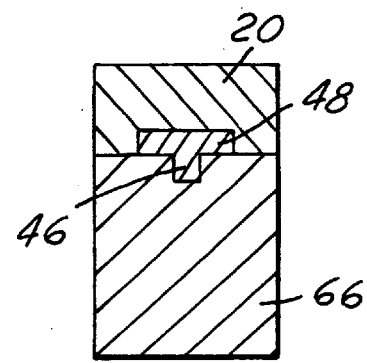

In an alternative embodiment of this invention, as shown in FIG. 4, each pulley mount 64 has sides that taper toward the center and meet to make a flat bottom. Pulley mounts 64 are modeled to engage a type of pulley used for v-belts. Alternatively, as shown in FIG. 5, pulley mounts 66 have a flat surface across the bottom without grooves to mate with a flat pulley. With the use of magnets 48, pulley mounts 24a, 64, 66 are interchangeable to fit various pulley sizes or types.

Figure 6:
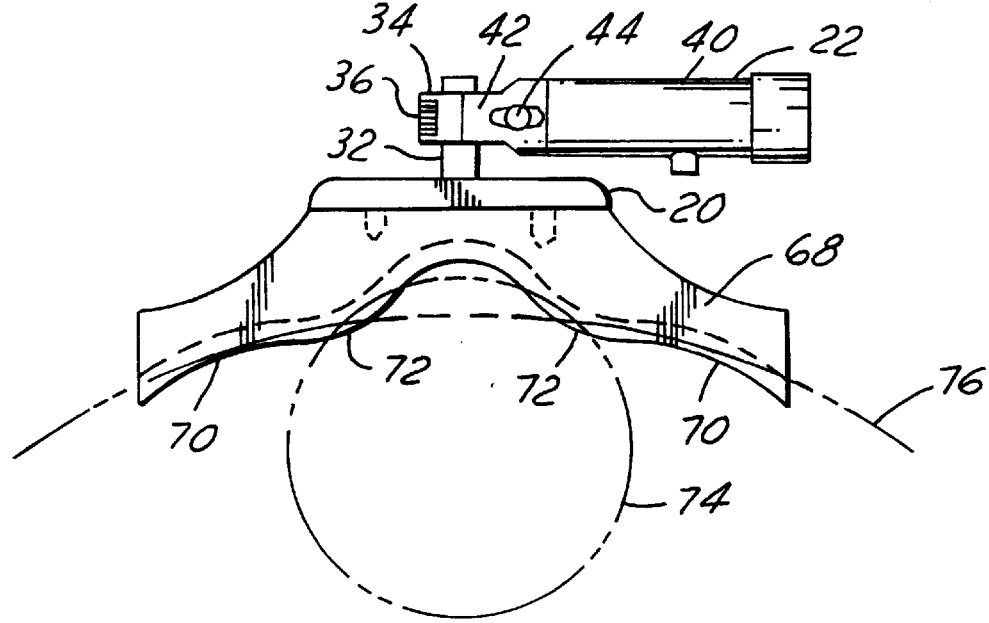

In another embodiment of this invention, shown in FIG. 6, a single pulley mount 68 having two concave surfaces 70 divided by two convex surfaces 72 is mounted to frame 20. This enables pulley mount 68 to accommodate an even greater variety of pulley diameters. The convex surface 72 closest to frame 20 is for mating with relatively smaller pulleys 74 while the adjacent concave surface 70 is for mating with relatively larger pulleys 76.

While the best mode for carrying out the invention has been described in detail, those skilled in the art in which this invention relates will recognize various alternative designs and embodiments, including those mentioned above, in practicing the invention that has been defined by the following claims. For example, the invention may be in the form of a kit, where the user assembles the desired pulley mounts to the frame and laser for aligning desired pulleys on an engine's front end accessory drive system. In addition, the invention may be used for aligning pulleys in pulley drive systems other than those on automotive front end accessory drive systems.

We claim:

1. An alignment gauge for aligning pulleys mounted in a drive system, the gauge comprising:

a frame;

a pulley mount attached to the frame, the mount being adapted to position the gauge on a first pulley of the drive system; and a laser mounted on the frame, the laser being adapted to emit a light beam onto a second pulley of the drive system so as to enable alignment of the first pulley relative to the second pulley.

wherein the pulley mount is removably attached to the frame, and wherein the pulley mount has a concave surface conjoined with the convex surface, the concave surface being adapted to engage a plurality of relatively large pulley diameters.

2. A kit of parts for aligning pulleys mounted in a drive system, the kit comprising:

a frame;

a pulley mount adapted to be attached to the frame, the mount being adapted to position the gauge on a first pulley of the drive system; and a laser adapted to be mounted on the frame, the laser being adapted to emit a light beam onto a second pulley of the drive system so as to enable alignment of the first pulley relative to the second pulley, wherein the pulley mount has a convex surface adapted to engage a plurality of relatively small pulley diameters, and wherein the pulley mount has a concave surface conjoined with the convex surface, the concave surface being adapted to engage a plurality of relatively large pulley diameters.

3. A pulley alignment gauge for aligning pulleys in a front end accessory drive system of an automotive engine, the gauge comprising:

a frame;

a pulley mount removably attached to the frame, the mount being adapted to engage a first pulley of the front end accessory drive system, the mount having a convex surface adapted to engage a plurality of pulley diameters; and a laser mounted on the frame, the laser being adapted to emit a light beam onto a center of a second pulley of the front end accessory drive system so as to enable alignment of the first pulley relative to the second pulley, wherein the pulley mount has a concave surface adjacent to and conjoined with the convex surface, the mount thereby being adapted to engage both a plurality of relatively small pulley diameters and a plurality of relatively large pulley diameters.

* * * * *